United States Patent [19]

Teeter et al.

[11] Patent Number: 5,203,434
[45] Date of Patent: Apr. 20, 1993

[54] MOUNTING STRUCTURE FOR CONE BRAKE

[75] Inventors: Timothy L. Teeter, Lucas, Ohio; James E. Hall, Fort Wayne, Ind.

[73] Assignee: Dana Corporation, Toledo, Ohio

[21] Appl. No.: 721,846

[22] Filed: Jun. 21, 1991

[51] Int. Cl.⁵ .............................................. F16D 63/00
[52] U.S. Cl. ................................. 188/70 R; 188/72.7
[58] Field of Search ................ 188/70 R, 72.7, 72.8, 188/72.9, 71.1, 72.1; 192/70.15, 89 A, 93 A, 93 B, 93 C

[56] References Cited

U.S. PATENT DOCUMENTS

| | | | |
|---|---|---|---|
| 1,332,487 | 3/1920 | Dale | 188/72.3 |
| 1,561,413 | 11/1925 | Descarries | 188/71.5 |
| 1,863,825 | 6/1932 | Blackmore | 188/140 R |
| 1,931,901 | 10/1933 | O'Brien | 188/72.8 |
| 2,020,809 | 11/1935 | Stock | 188/72.2 |
| 2,107,091 | 2/1938 | Swennes | 188/72.7 X |
| 2,243,103 | 5/1941 | Knox | 188/72.7 |
| 2,861,291 | 11/1958 | Milton | 16/65 |
| 3,155,195 | 11/1964 | Brawerman | 188/72.8 X |
| 3,765,511 | 10/1973 | Toyomasu | 188/72.3 |
| 3,822,768 | 7/1974 | Sebulke | 192/8 R X |
| 3,961,771 | 6/1976 | Kumasaka | 188/134 X |
| 4,099,601 | 7/1978 | Pittman | 188/163 |
| 4,103,566 | 8/1978 | von Kaler et al. | 475/206 |
| 4,182,194 | 1/1980 | Tomozawa | 188/26 X |
| 4,187,931 | 2/1980 | Balzer | 188/72.5 |
| 4,212,379 | 7/1980 | Zoino | 192/70.15 |
| 4,633,978 | 1/1987 | Hoff | 188/72.8 X |
| 4,633,979 | 1/1987 | Edwards | 188/72.7 |

FOREIGN PATENT DOCUMENTS

| | | | |
|---|---|---|---|
| 876778 | 5/1953 | Fed. Rep. of Germany | 188/72.8 |
| 884818 | 8/1943 | France | 188/70 R |
| 28341 | 6/1914 | United Kingdom | 188/72.8 |

Primary Examiner—Douglas C. Butler
Assistant Examiner—Alfred Muratori
Attorney, Agent, or Firm—Dykema Gossett

[57] ABSTRACT

An improved cone brake is disclosed having a lever which selectively moves a brake shoe into engagement with a brake drum to prevent rotation of a shaft. Cam faces on the lever and brake are configured to ensure that the brake shoe is guided smoothly and accurately into engagement with the brake drum. The disclosed brake shoe cam face may be used with levers moving in either direction of rotation about an axis of rotation of the shaft. This increases the versatility of the brake shoe. In another feature, a casing for the brake includes a slot which receives an anti-rotation key from the brake shoe. The brake shoe and lever are mounted on a portion of the brake drum to reduce the axial length of the brake. The overall construction is relatively simple and ensures that the cone brake is actuated and guided properly and smoothly to stop rotation of the shaft.

17 Claims, 2 Drawing Sheets

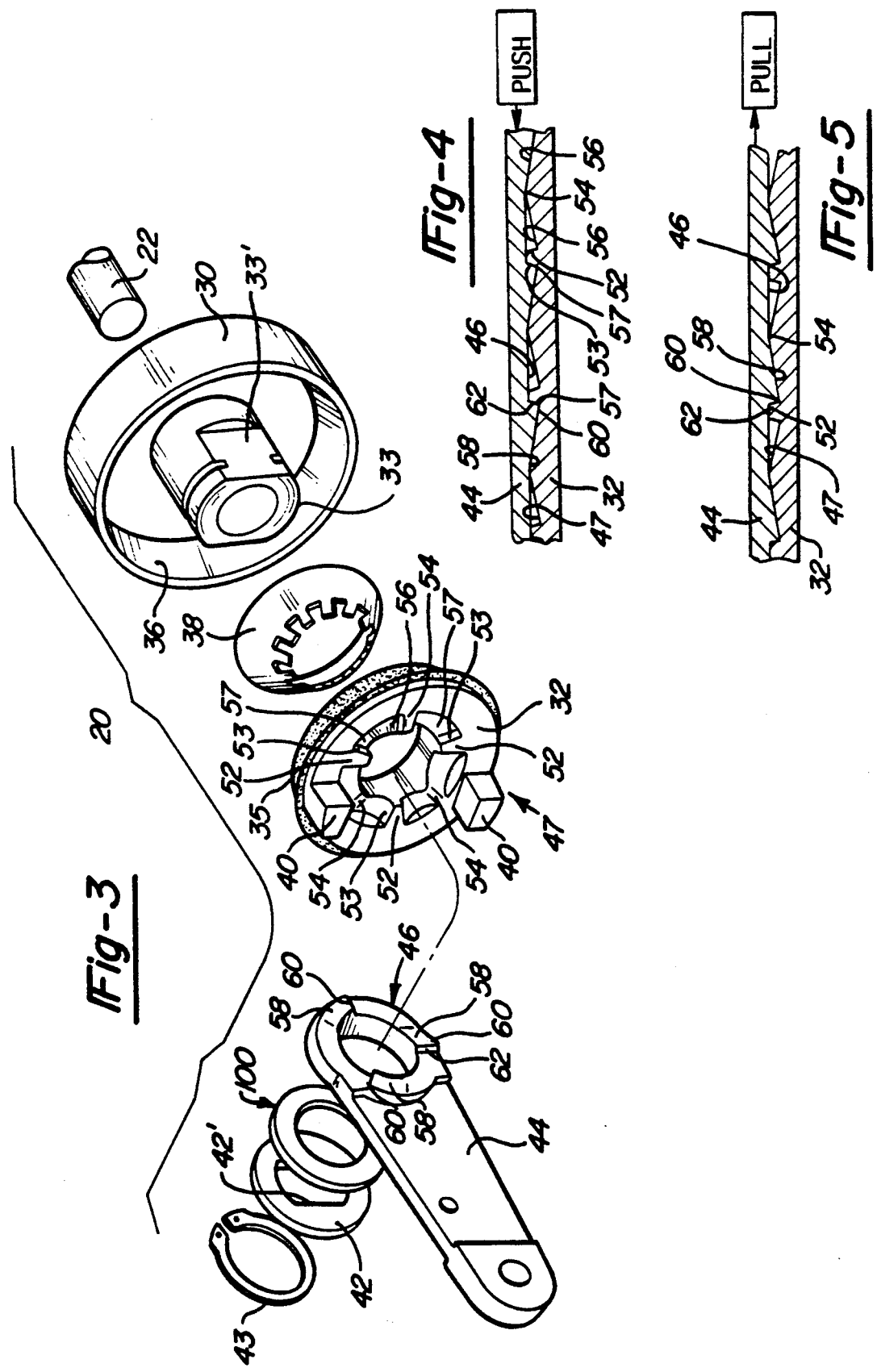

MOUNTING STRUCTURE FOR CONE BRAKE

BACKGROUND OF THE INVENTION

This application relates in general to an improved cone brake having unique mounting and guidance structure.

Small vehicles, such as lawn or garden vehicle, have typically utilized caliper disc brakes, band brakes, or expanding shoe brakes. The positioning of the brake surfaces in such brakes is somewhat inaccurate and therefore the brake force may be unpredictable. Further, wear is a problem with these brakes, since there is a relatively small frictional contact area.

Brakes having conically-shaped friction surfaces, or cone brakes, are known. In these brakes, a brake shoe has a conically-shaped outer peripheral surface which is selectively brought into engagement with a conically-shaped inner peripheral surface of a brake drum to stop rotation of a shaft affixed to the drum. An actuating member typically has a cam surface which engages a cam surface on the brake shoe. The actuating member is selectively rotated, and its cam surface causes the brake shoe to move towards the brake drum. These brakes do address the above-discussed problems with regard to accuracy and increased wear, but the mounting and guidance structure used with these prior art cone brakes is often overly complex and non-versatile.

SUMMARY OF THE INVENTION

A disclosed cone brake includes a brake shoe which is selectively movable towards a brake drum to prevent rotation of a shaft. In one aspect of the present invention a casing surrounding the brake is formed by two abutting housing members. The housing members mate to define a pair of slots. The slots receive anti-rotation keys formed on the brake shoe. The slots are formed simply and accurately, and ensure that the brake shoe is properly guided for movement between released and braking positions.

In a further aspect of the present invention, cam surfaces are formed on the brake shoe, and mating cam surfaces are formed on a lever which is selectively rotated to move the brake shoe towards the brake drum. The brake shoe cam surfaces extend inwardly from a rear face of the brake shoe away from the lever. The lever cam surfaces extend beyond the rear face of the brake shoe and engage the brake shoe cam surfaces.

Stop points on the brake shoe cam surfaces define a stop position for the lever when in the non-braking position. Ramped surfaces are formed on both the brake shoe and on the lever, and the ramped surfaces on the lever are moved along the ramped surfaces on the brake shoe such that the brake shoe is guided away from the lever and towards the brake drum to the braking position.

Brake points are defined at the end of the brake shoe ramped surfaces. The brake shoe includes identical ramped surfaces on each circumferential side of the brake points, allowing a single brake shoe to be utilized with levers moved in either rotational direction relative to the shaft axis. This increases the versatility of the brake shoe, allowing it to be used with a number of different levers, and lever actuating mechanisms. Further, the same brake shoe may be used on opposed sides of a vehicle.

In another aspect of the present invention, the brake shoe and lever are uniquely mounted to reduce the axial length of the brake, and make the brake a self-contained unit.

These and other features of the present invention can be best understood from the following specification and drawings of which the following is a brief description.

BRIEF DESCRIPTION OF THE DRAWINGS

FIG. 3 is an assembly view of the brake illustrated in FIG. 1.

FIG. 4 is a cross-sectional view of the cam surfaces for actuating the brake.

FIG. 5 is a view similar to that shown in FIG. 4, but showing an alternative mode of operation.

DETAILED DESCRIPTION OF A PREFERRED EMBODIMENT

Figure 1:
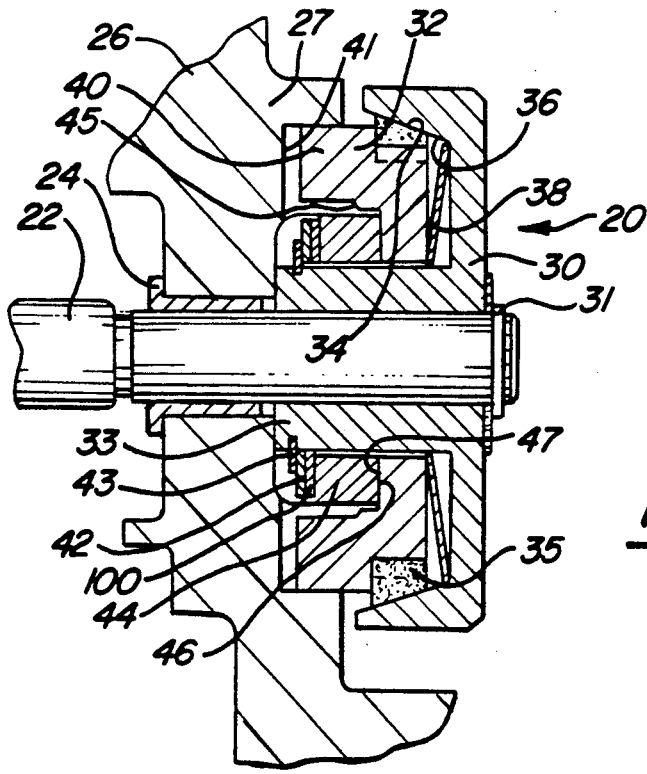
FIG. 1 is a cross-sectional view through an improved cone brake.

An improved cone brake 20 for stopping rotation of shaft 22 is illustrated in FIG. 1. Shaft 22 is mounted within bearing 24 in a first housing member 26. A mating housing member, disclosed below, abuts end face 27 of first housing 26 to form a casing enclosing brake 20. Brake drum 30 is splined to rotate with shaft 22 about a single axis of rotation, and prevented from moving off shaft 22 by ring 31.

Brake shoe 32 is slidably positioned upon sleeve 33 of drum 30. Friction material 35 is disposed on shoe 32, and defines a conically-shaped outer peripheral surface 34. Drum 30 has a conically-shaped inner peripheral surface 36. In the braking position shown in FIG. 1, outer peripheral surface 34 engages inner peripheral surface 36 to stop rotation of shaft 22.

In a released position, shoe 32 is moved to the left, as shown in FIG. 1, such that surfaces 34 and 36 no longer contact. At that position shaft 22 can freely rotate. Disc spring 38 normally biases shoe 32 towards this released non-braking position.

Anti-rotation keys 40 defined at two distinct circumferential positions on shoe 22 are received in slots 41 formed by the housing members. Keys 40 ensure that shoe 32 is guided parallel to the axis of shaft 22, and does not rotate about that axis.

Retaining ring 43, washer 42 and bronze thrust bearing 100 are received on sleeve 33, and axially retain lever 44 and shoe 32 on sleeve 33. Washer 42 has flats on its inner diameter to match flats on sleeve of drum 30, so washer 42 rotates with drum 30. Shoe 32, drum 30 and lever 44 are thus, contained as a unit. Lever 44 has a cam face 46 facing a mating cam face 47 on shoe 32. Cam face 47 is formed inwardly of a nominal rear face 45 of shoe 32. Cam face 46 extends beyond rear face 45 to contact cam face 47. Spring 38 biases shoe 32 against lever 44, ensuring they remain in abutting contact. Ring 43 and washer 42 rotate with drum 30 and shaft 22. Shoe 32 does not rotate, and lever 44 is free to rotate to actuate shoe 32. By rotating lever 44 relative to shoe 32, cam surface 46 moves along cam surface 47, and brake shoe 32 is moved against the force of spring 38 to engage surface 34 with surface 36.

Since lever 44, brake shoe 32 and spring 38 are all mounted on sleeve 33, the axial length of brake 20 is reduced. Keys 40 are formed radially outwardly of lever 44, further reducing the axial length.

Figure 2:
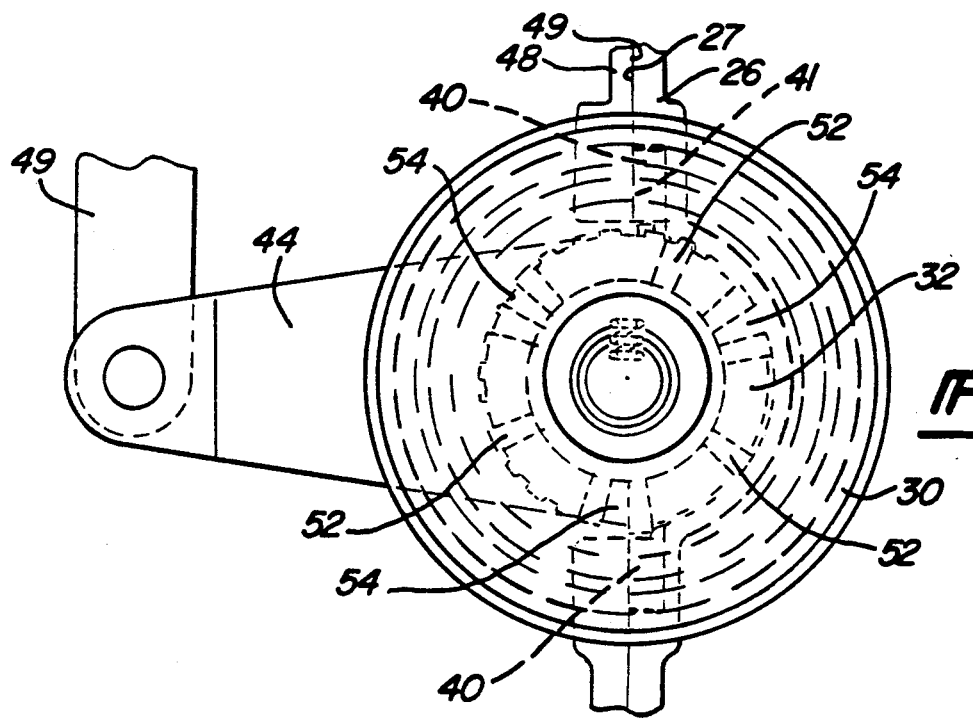
FIG. 2 is an end view through the cone brake illustrated in FIG. 1.

FIG. 2 is an end view of brake 20 as illustrated in FIG. 1. Lever 44 extends radially outwardly over a limited circumferential extent. Actuating member 102 pushes or pulls an end of lever 44, through well-known structure, to rotate lever 44 relative to shoe 32. Second housing member 48 has face 49 abutting face 27 of housing 26 to define slots 41 at two distinct circumferential positions. Slots 41 receive keys 40. Slots 41 are formed by notches in housing 26 and face 49.

Cam face 47 on shoe 32 consists of a plurality of distinct stop points 52 and a plurality of brake points 54 positioned between adjacent stop points 52. As will be described below, lever 44 is moved through a limited extent about the axis of shaft 22, and cam face 46 on lever 44 moves against cam face 47 on shoe 32 to move shoe 32 to the braking position against the force of spring 38.

FIG. 3 is an exploded view of brake 20. As shown, shoe 32 has cam face 47 which includes stop points 52 approximately at the same axial position as rear face 45. Flat surfaces 53 on each circumferential side of stop points 52 extend generally perpendicularly inwardly relative to rear face 45. Brake points 54 are also approximately at the same axial position as rear face 45. Ramped surfaces 56 extend circumfentially and axially from stop ends 57 adjacent flat surfaces 53, and merge into an adjacent brake point 54. Stop ends 57 are the portion of surface 56 most removed from lever 44. A mirrored ramped surface 56 is formed on each circumferential side of each brake point 54.

Lever 44 has ramped surfaces 58 which ride on surfaces 56 and force brake shoe 32 towards brake drum 30. Brake points 60 are defined at an end of ramped surfaces 58 spaced axially towards shoe 32. When brake points 60 approach brake points 54, lever 44 forces brake shoe 32 towards drum 30 to the braking position. Lever stop faces 62 are formed generally parallel to the axis of shaft 22, on an opposed side of brake points 60 from surfaces 58. Stop faces 62 abut flat surfaces 53 to define stops for lever 44 in the non-braking position of brake shoe 32. This abutting contact defines a stop to retain shoe 32 and lever 44 in the released non-braking position. Spring 38 biases shoe 32 towards this position.

Flats 42' are aligned on flats 33' of sleeve 33. Washer 100 is also received on sleeve 33.

As shown in FIG. 4, lever 44 is in a non-braking position. Brake points 60 on lever 44 are adacent stop ends 57. Stop faces 62 abut left flat surfaces 53. Should lever 44 be moved to the left, as shown in this figure, surfaces 58 ride along surfaces 56. Brake points 60 approach brake points 52 and shoe 32 is forced towards drum 30. Lever 44 cannot move axially away from shoe 32 due to washer 42 and retaining ring 43. The right ramped surfaces 56 do not contact lever 44 during this actuation.

FIG. 5 illustrates a brake assembly similar to that shown in FIG. 4, but disclosing one further feature of brake 20. As shown in FIG. 5, lever 44 has been replaced, or reversed from the structure shown in FIG. 4. Brake point 60 has surface 58 to the right, as shown in this figure, with stop face 62 to the left. This is opposite to the relationship shown in FIG. 4. Lever 44 is moved to the right to cause brake shoe 32 to move towards brake drum 30. Brake shoe 32 is identical to that illustrated in FIG. 4, but now right ramped surface 56 engages surface 58.

Thus, brake shoe 32 has a cam face 47 which can be used with levers moved in either direction, that is, pushed or pulled to engage brake shoe 32. This reduces the different types of brake shoes which must be manufactured. The same brake shoe can be utilized on opposed sides of a vehicle by merely utilizing two distinct levers 44, or changing the circumferential position of lever 44 relative to the brake shoe.

In one preferred embodiment of the present invention the conical inner peripheral surface of drum 30 expanded at an angle of 20°. The conical outer peripheral surface of shoe 32 expand at an angle of 19.5°–20.5°. Friction material 33 was formed of a friction material available from P.M. Automotive of Batavia, Ill. under their product number 9308.

A preferred embodiment of the present invention has been disclosed, however, a worker of ordinary skill in the art would recognize that certain modifications would come within the scope of this invention. For that reason the following claims should be studied in order to determine the true scope and content of this invention.

We claim:

1. A brake assembly comprising:
   a shaft received in a housing for rotation about an axis;
   a brake drum fixed to rotate with said shaft, said brake drum having a bore defining a conically-tapered inner peripheral surface;
   a brake shoe mounted for limited axial movement relative to said shaft and said brake drum, said brake shoe having a conically-tapered outer peripheral surface which is selectably engaged with said inner peripheral surface on said brake drum to prevent rotation of said shaft;
   means for causing said selective engagement;
   said brake shoe having at least one anti-rotation key, at least one slot defined in said housing, said key being slidably received in said slot, and preventing rotation of said brake shoe about said axis;
   said slot in said housing being formed by two abutting housing portions;
   said means for causing said selective engagement includes a lever having a cam face in contact with a cam face on said brake shoe, said lever being rotatable to move said brake shoe from a removed non-braking position, where said inner peripheral surface of said brake drum is not contacted by said outer peripheral surface of said brake shoe, to an engaged braking position at which said inner peripheral surface of said brake drum engages said outer peripheral surface of said brake shoe;
   said cam face on said brake shoe includes a plurality of circumferentially-spaced stop points at a first axial position relative to said axis, and a plurality of circumferentially-spaced brake points, said brake points being spaced between adjacent stop points such that stop points are disposed on either circumferential side of each said brake points ramped surfaces being formed intermediates each of said brake points and said stop points, each of said ramped surfaces including a stop end adjacent said stop point at a second axial position, said stop end being the portion of said brake shoe cam face most removed from said lever, flat surfaces extending from said first axial position to said second axial position and connecting said stop points and said stop ends, said ramped surfaces extending from said stop end circumferentially in a direction towards said brake points and axially towards said lever, such that an opposed end of said ramped surface is at the same axial position as said brake point; and said lever cam face including a plurality of brake points, and a ramped surface on one circumferential side of each said lever brake point, a stop face formed on a second circumferential side of each said lever brake point, each said stop face abutting one of said flat surfaces when said brake shoe is in the removed position, and said ramped surface of said lever being movable along said ramped surface of said brake shoe when said lever is rotated, such that said lever brake point approaches the circumferential position of said brake shoe brake point to cause said brake shoe to move towards said brake drum.

2. A brake assembly as recited in claim 1, wherein said lever extends radially outwardly of said housing, said lever receiving an actuating member at one end, said actuating member selectively rotating said lever, and causing said brake shoe to move between said non-braking and braking positions.

3. A brake assembly as recited in claim 1, wherein only one of said ramped surfaces on the two circumferential sides of each said brake shoe brake point is utilized in any one brake assembly, allowing distinct types of levers and lever actuating arrangements to be utilized with a single brake shoe.

4. A brake assembly as recited in claim 1, wherein said brake shoe has a rear face at said first axial position, said stop points and said brake shoe brake points being approximately at said first axial position, said brake shoe ramped surface and said stop ends being spaced axially away from said lever, and inwardly of said brake shoe relative to said rear face.

5. A brake assembly as recited in claim 4, wherein said keys on said brake shoe extend axially beyond said rear face of said brake shoe in a direction towards said lever.

6. A brake assembly as recited in claim 5, wherein said keys extend axially beyond said lever.

7. A brake assembly as recited in claim 1, wherein a friction material is disposed at said outer peripheral surface of said brake shoe.

8. A brake assembly as recited in claim 1, wherein said brake drum having a tubular sleeve at a position within said bore radially inwardly from said inner peripheral surface, and said brake shoe being slidably received on said sleeve.

9. A brake assembly as recited in claim 8, wherein a spring is positioned between said brake drum and abutting a face of said brake shoe to bias said brake shoe away from said brake drum, said means for selective engagement forcing said brake shoe to overcome the bias force of said spring and move towards said brake drum.

10. A brake assembly comprising:
a shaft received in a housing for rotation about an axis;
a brake drum fixed to rotate with said shaft, said brake drum having a friction surface;
a brake shoe mounted for limited axial movement relative to said shaft and said brake drum, said brake shoe having a friction surface which is selectably engaged with said friction surface on said brake drum to prevent rotation of said shaft;
a lever having a cam face in contact with a cam face on said brake shoe, said lever being rotatable to move said brake shoe from a removed non-braking position where said friction surface of said brake drum is not contacted by said friction surface of said brake shoe, to an engaged braking position at which said friction surface of said brake drum does engage said friction surface of said brake shoe;

said cam face on said brake shoe including a plurality of circumferentially spaced stop points at a first axial position relative to said axis, and a plurality of circumferentially spaced brake points, said brake points being spaced between adjacent stop points such that stop points are disposed on either circumferential side of each said brake point, ramped surfaces being formed intermediate each of said brake points and said stop points, each of said ramped surfaces including a stop end adjacent said stop point at a second axial position, said stop end being the portion of said brake shoe cam face most removed from said lever, flat surfaces extending from said first axial position to said second axial position and connecting said stop points and said stop ends, said ramped surfaces extending from said stop end circumferentially in a direction towards said brake point, and axially towards said lever, such that an opposed end of said ramped surface merges into an adjacent one of said brake points; and said lever cam face including a plurality of brake points, and a ramped surface on one circumferential side of each said lever brake point, a stop face formed on a second circumferential side of each said lever brake point, each said stop face abutting one of said flat surfaces when said brake shoe is in the removed position, and said ramped surface of said lever being movable along said ramped surface of said brake shoe when said lever is rotated, such that said lever brake point approaches the circumferential position of said brake shoe brake point to cause said brake shoe to move towards said brake drum.

11. A brake assembly as recited in claim 10, wherein only one of said ramped surfaces on the two circumferential sides of each said brake shoe brake point is utilized in any one brake assembly, allowing distinct types of levers and lever actuating arrangements to be utilized with a single brake shoe.

12. A brake assembly as recited in claim 10, wherein said brake shoe has a rear face at said first axial position, said stop points and said brake shoe brake points being approximately at said first axial position, said brake shoe ramped surface and said stop ends being spaced axially inwardly of said brake shoe relative to said rear face.

13. A brake assembly as recited in claim 10, wherein said friction surface of said brake drum is a conically-tapered inner peripheral surface, and said friction surface of said brake shoe is a conically-tapered outer peripheral surface.

14. A brake assembly as recited in claim 13, wherein said brake drum having a tubular sleeve at a position radially inwardly from said inner peripheral surface, and said brake shoe is slidably received on said sleeve.

15. A brake assembly as recited in claim 14, wherein a spring is positioned between said brake drum and abutting a face of said brake shoe to bias said brake shoe away from said brake drum, said means for selective engagement forcing said brake shoe to overcome the bias force of said spring and move towards said brake drum.

16. A brake assembly comprising:

a shaft received in a housing for rotation about an axis;

a brake drum fixed to rotate with said shaft, said brake drum having a conically-tapered inner peripheral friction surface;

a brake shoe mounted for limited axial movement relative to said shaft and said brake drum, said brake shoe having a conically-tapered outer peripheral friction surface which is selectably engaged with said friction surface on said brake drum to prevent rotation of said shaft;

a lever having a cam face in contact with a cam face on said brake shoe, said lever being rotatable to move said brake shoe from a removed non-braking position where said friction surface of said brake drum is not contacted by said friction surface of said brake shoe, to an engaged braking position at which said friction surface of said brake drum does engage said friction surface of said brake shoe; and said brake drum having a tubular sleeve at a position radially inwardly from said inner peripheral surface, said brake shoe being slidably received on said sleeve, said lever being rotatably received on said sleeve and rotatable about said axis, and a spring being positioned between said brake drum and abutting a face of said brake shoe to bias said brake shoe away from said brake drum into contact with said lever, said lever being adapted to cause said brake shoe to overcome the biased force of said spring and move towards said brake drum.

17. A brake assembly as recited in claim 16, wherein keys are formed on said brake shoe and are received in slots formed in said housing, said keys on said brake shoe extend axially beyond said lever, and radially outwardly of said lever.

* * * * *